US012801647B2

(12) United States Patent
Agarwal et al.

(10) Patent No.: US 12,801,647 B2
(45) Date of Patent: Nov. 17, 2026

(54) MACHINE-LEARNING PROMPT ENHANCEMENT

(71) Applicant: Adobe Inc., San Jose, CA (US)

(72) Inventors: Dhwanit Agarwal, San Jose, CA (US); Shradha Agrawal, Milpitas, CA (US); Deepak Pai, Sunnyvale, CA (US); Ambareesh Revanur, San Jose, CA (US)

(73) Assignee: Adobe Inc., San Jose, CA (US)

( * ) Notice: Subject to any disclaimer, the term of this patent is extended or adjusted under 35 U.S.C. 154(b) by 29 days.

(21) Appl. No.: 19/042,896

(22) Filed: Jan. 31, 2025

(65) Prior Publication Data

US 2026/0228262 A1 Aug. 6, 2026

(51) Int. Cl.
*G06F 16/334* (2025.01)
*G06F 40/279* (2020.01)

(52) U.S. Cl.
CPC ........ *G06F 16/3344* (2019.01); *G06F 40/279* (2020.01)

(58) Field of Classification Search
CPC .................................................... G06F 16/3344
See application file for complete search history.

(56) References Cited

U.S. PATENT DOCUMENTS 12,322,036 B1 * 6/2025 Affleck-Boldt ......... G06T 15/00
2023/0315775 A1 * 10/2023 Anbalagapandian ........................ G06F 16/435 707/738
2025/0061307 A1 * 2/2025 Tran ....................... G06N 3/045
2025/0078454 A1 * 3/2025 Saraee .................. G06F 16/438

OTHER PUBLICATIONS

"ModifiX: Training visual knowledge priors to enhance prompts for marketing photography", 2025, 22 pages.
Feng, et al., "PromptMagician: Interactive Prompt Engineering for Text-to-Image Creation", Cornell University, arXiv.org, [retrieved from the internet on Apr. 8, 2025], <https://arxiv.org/pdf/2307.09036>, Aug. 15, 2023, 11 pages.
Github, "DALL-E 2—Pytorch", [retrieved from the internet on Apr. 8, 2025], <https://github.com/lucidrains/DALLE2-pytorch>, 2025, 21 pages.
Hao, et al., "Optimizing Prompts for Text-to-Image Generation", 37th Conference on Neural Information Processing Systems (NeurIPS 2023), [retrieved from the internet on Apr. 8, 2025], <https://proceedings.neurips.cc/paper_files/paper/2023/file/d346d91999074dd8d6073d4c3b13733b-Paper-Conference.pdf>, 2023, 17 pages.

(Continued)

*Primary Examiner* — Van H Oberly
(74) *Attorney, Agent, or Firm* — FIG. 1 Patents

(57) ABSTRACT

Machine-learning prompt enhancement techniques are described. In one or more examples, by generating training data from high-quality digital content meeting specific criteria, a generative artificial intelligence (AI) system is configurable to train an enhancement machine-learning model to capture features pertaining to particular tasks or scenarios. The trained enhancement machine-learning model can then extract enhancement features from inputs, enabling the formation of enhanced prompts that guide generative AI models to generate digital content as suitable for the particular tasks or scenarios.

20 Claims, 9 Drawing Sheets

(56) References Cited

OTHER PUBLICATIONS

Liu, et al., “Visual Instruction Tuning”, Cornell University, arXiv.org, [retrieved from the internet on Oct. 23, 2024], <https://arxiv.org/pdf/2304.08485>, Dec. 11, 2023, 25 pages.
Mañas, et al., “Improving Text-to-Image Consistency via Automatic Prompt Optimization”, Cornell University, arXiv.org, [retrieved from the internet on Apr. 8, 2025], <https://arxiv.org/pdf/2403.17804>, Mar. 26, 2024, 24 Pages.
Oppenlaender, Jonas, “A taxonomy of prompt modifiers for text-to-image generation”, [retrieved from the internet on Apr. 8, 2025], <https://www.tandfonline.com/doi/pdf/10.1080/0144929X.2023.2286532>, Nov. 28, 2023, 15 pages.
Wang, et al., “DiffusionDB: A Large-scale Prompt Gallery Dataset for Text-to-Image Generative Models”, Cornell University, arXiv.org, [retrieved from the internet on Apr. 8, 2025], <https://arxiv.org/pdf/2210.14896>, Jul. 6, 2023, 17 pages.
Wu, et al., “Human Preference Score v2: A Solid Benchmark for Evaluating Human Preferences of Text-to-Image Synthesis”, Cornell University, arXiv.org, [retrieved from the internet on Apr. 8, 2025], <https://arxiv.org/pdf/2306.09341>, Sep. 25, 2023, 24 Pages.

* cited by examiner

600

Prompt Refinement Query 510

You are an expert photographer and prompt engineer specializing in creating detailed, visually appealing prompts for marketing product photography. Your task is to transform a simple product description into a comprehensive, vivid scene that showcases the product in the best possible light for marketing purposes.

Follow these steps to create an enhanced prompt:

1. Analyze the product: - Identify the key features and unique selling points of the product. - Determine the product category and its typical use case or environment.
2. Set the scene: - Choose an appropriate setting that complements the product and its intended use. - Consider both indoor and outdoor locations, depending on what best showcases the product. - Think about the time of day and lighting conditions that would enhance the product's appeal.
3. Composition: - Position the product as the focal point of the image. - Decide on an angle that best highlights the product's key features. - Include relevant props or accessories that complement the product without overshadowing it.
4. Lighting: - Describe the main light source (natural or artificial) and its direction. - Consider adding secondary light sources for depth and highlights. - Think about how light interacts with the product's materials (e.g., reflections on metallic surfaces).
5. Color palette:
- Choose a color scheme that complements the product's colors. - Consider using contrasting colors to make the product stand out.
6. Mood and atmosphere: - Determine the overall mood that best represents the product's brand identity. - Add atmospheric elements like mist, bokeh, or lens flares if appropriate.
7. Technical details: - Specify camera angle, focal length, or depth of field if relevant.
8. Human elements (if applicable): - Decide whether to include people in the image and how they should interact with the product. - Consider hands or silhouettes if you want to show scale or usage without full human figures.
9. Enhance and enhance: - Add sensory details that bring the scene to life (e.g., steam rising from a coffee cup). - Use vivid, descriptive language to create a clear mental image.
10. Marketing angle: - Ensure the enhanced prompt aligns with marketing goals and brand identity if given. - Think about how the image could be used in various marketing materials.

Now, transform the given naive product description into a enhanced, detailed prompt for a marketing-ready image. The output should be a single paragraph, not more than 3-4 lines that vividly describes the scene, incorporating all relevant elements discussed above. Ensure that the product remains the star of the image while creating an appealing and context-rich environment around it. Do not be too verbose.

Fig. 6

MACHINE-LEARNING PROMPT ENHANCEMENT

BACKGROUND

Generative artificial intelligence (AI) is implemented using a machine-learning model in order to generate digital content. To do so, the machine-learning model is typically trained on vast datasets, thereby enabling the machine-learning model to understand and mimic patterns in training data. Therefore, when generating digital content, the machine-learning model uses this learned knowledge to produce a new item of digital content based on a prompt.

Conventional techniques used to implement generative artificial intelligence as part of digital content generation, however, often fail in real-world examples. Conventional techniques, for instance, typically involve use of machine-learning models trained using generalized training data and thus are trained to produce generalized results.

SUMMARY

Machine-learning prompt enhancement techniques are described. In one or more examples, by generating training data from high-quality digital content meeting specific criteria, a generative artificial intelligence (AI) system is configurable to train an enhancement machine-learning model to capture features relevant to particular tasks or scenarios. The trained enhancement machine-learning model then extracts enhancement features from inputs, enabling the formation of enhanced prompts that guide generative AI models to generate digital content as suitable for the particular tasks or scenarios. The use of a prompt refinement query in conjunction with the extracted features allows for fine-grained control over the generated content's characteristics in forming the enhanced prompt, such as visual aspects, composition, and style. This approach expands the functionality of generative machine-learning models without involving retraining of the generative machine-learning models, thereby improving computational efficiency and flexibility across diverse specialized scenarios that is not possible in conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 6 depicts an example implementation of a prompt refinement query usable to prompt a prompt refinement machine-learning model with enhancement features to generate an enhanced prompt.

DETAILED DESCRIPTION

Overview

Figure 1:
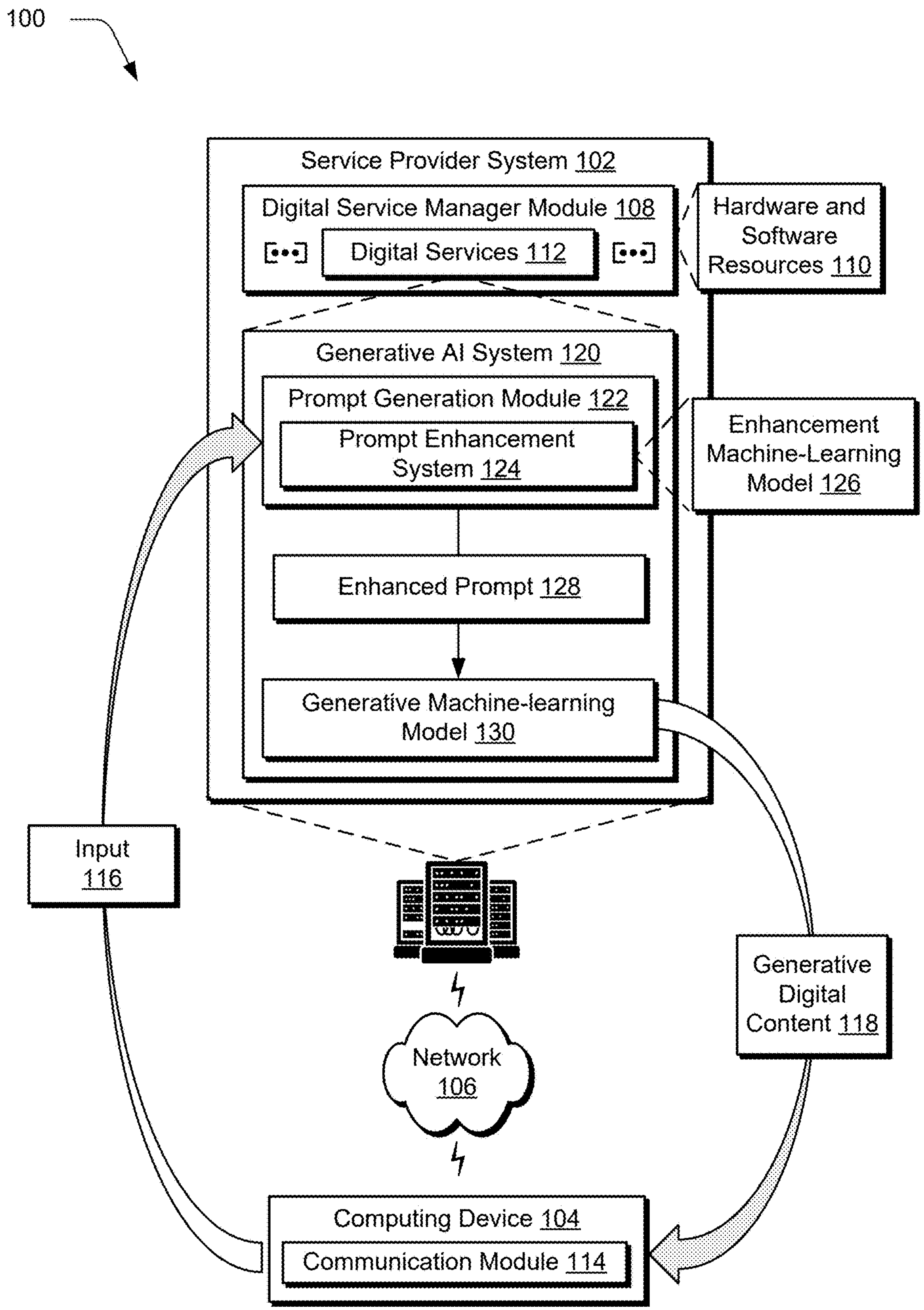
FIG. 1 is an illustration of a digital medium environment in an example implementation that is operable to employ enhancement machine-learning model training data generation and implementation techniques described herein.

Machine-learning models support a variety of functionalities. In one such example, generative artificial intelligence (AI) is implemented using a machine-learning model in order to generate digital content. A variety of types of digital content may be generated based on a variety of inputs, examples of which include digital images, digital audio, digital video, text, executable code and so forth that may be generated based on a variety of inputs including text, digital images, and so forth.

To do so in conventional examples, the machine-learning model is typically trained on vast datasets of generalized training data, thereby enabling the machine-learning model to understand and mimic patterns in the training data. The machine-learning model then uses this generalized knowledge to produce an item of digital content based on a prompt. However, this generalized training may result in a variety of inaccuracies and a lack of flexibility of the machine-learning model to generate digital content for use in different specialized scenarios.

Accordingly, to address these and other technical challenges machine-learning prompt enhancement techniques are described in support of generative artificial intelligence as implemented by one or more machine-learning models. An example of which is described in the following discussion as a "generative machine-learning model."

A generative artificial intelligence (AI) system is described that is configured to receive an input (e.g., a prompt), and based on that input, produce generative digital content using a generative machine-learning model. The generative AI system further includes a prompt generation module that is configured to generate a prompt based on the input for processing by the generative machine-learning model.

As part of generating the prompt, a prompt enhancement system is also included having an enhancement machine-learning model that is configured to enhance the prompt (i.e., form an "enhanced prompt"), automatically and without user intervention, for processing by the generative machine-learning model to achieve a desired output. The enhancement is added to the prompt as part of the query to guide subsequent processing towards achieving a desired result, automatically and without user intervention. In this way, functionality of the generative machine-learning model may be expanded without retraining through use of the enhancement machine-learning model, which is not possible in conventional techniques.

Consider a scenario in which a digital image is to be generated based on an input for use in a particular scenario. Visual aspects of the digital image, however, may vary greatly depending on the particular scenario. For example, an input specifying "an automobile" may have different visual aspects for use as part of a technical journal (e.g., as a line vector image), a greeting card (e.g., as a colored cartoonish image), for use in marketing materials, and so forth. Conventional techniques, however, are incapable of addressing these different scenarios with sufficient precision, thereby leading to inaccuracies and inefficient use of computational resources due to multiple trial-and-error attempts.

In the techniques described herein, however, the prompt enhancement system employs an enhancement machine-learning model that is configured to identify and address a variety of criteria in a way that makes the digital content suitable for use in a particular scenario. The enhancement machine-learning model, for instance, is trainable using training digital content selected that meets criteria suitable for a particular task, e.g., visual qualities of a digital image suitable for a technical publication. The enhancement machine-learning model is configurable in a variety of ways, examples of which include a diffusion transformer as further shown in FIG. 4.

The enhancement machine-learning model, once trained, is then configured to generate enhancement features based on the input, e.g., as extracted in an embedding space trained using the training data. The enhancement features are then processed along with a prompt refinement query by a prompt refinement machine-learning model to generate a prompt that is enhanced based on the enhancement features. The enhancement features, for instance, may identify criteria suitable for a particular task that are identified from the input, e.g., one or more visual aspects to be used. The prompt refinement query is configurable to specify a plurality of steps to be followed in generating the prompt. The steps, for instance, may include instructions to set a visual scene, composition, lighting, a color palette, a mood and atmosphere, and technical camera details.

From this, the prompt refinement machine-learning model is then configurable to generate the enhanced prompt based on the prompt refinement query and the enhancement features. For example, an input may be received defining "a blue sports car." A text embedding machine-learning model is first employed to generate a corresponding text embedding. An enhancement machine-learning model configurable as a diffusion transformer generates enhancement features based on the text embedding. The enhancement machine-learning model, for instance, may be trained to identify visual qualities of a digital image suitable for a technical publication, a result of which is output as the enhancement features.

The prompt refinement machine-learning model then processes the enhancement features along with a prompt refinement query to generate the enhanced prompt as refined based on enhancement features from the enhancement machine-learning model. The prompt refinement query, for instance, includes instructions to set a visual scene, composition, lighting, a color palette, a mood and atmosphere, and technical camera details as suitable for use in a technical document. Therefore, the enhanced prompt is configurable to include those considerations, e.g., "make as a vector image," "employ a particular viewpoint," "include an amount of detail in support of being physically printed," and so forth based on the features extracted by the enhancement machine-learning model for use with respect to a particular task.

In this way, the enhanced prompt is then usable by a generative machine-learning model to generate a digital image in this example that is suitable for this particular task as trained by the enhancement machine-learning model. As a result, functionality of the generative machine-learning model is expanded without retraining, thereby improving computational resource efficiency, expanding functionalities supported by the generative machine-learning model, and so forth. Further discussion of these and other examples is included in the following sections and shown in corresponding figures.

Term Examples

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

A "large language model" (LLM) is a type of machine-learning model that is designed to understand, generate, and interact with human language inputs at a large scale. These machine-learning models are trained on vast amounts of text data using deep learning techniques (e.g., neural networks) to learn patterns, nuances, and the structure of language. The use of the term "large" refers to both the size of the training data and also to the complexity and scale of the neural networks, which may include billions or even trillions of parameters.

Large language models are configurable to perform a wide range of language-related tasks without being explicitly programmed for each one. Examples of these tasks include text generation, translation, summarization, question answering, sentiment analysis, and natural language processing. To train a large language model, the underlying machine-learning model is provided with training data that includes examples of text to train and retrain the model to predict a next word in a sequence. Over time, the model, once trained, is configured to generate text that is coherent and contextually relevant, is configurable to mimic a style and content of the training data, and so forth. In this way, large language models provides a foundational tool in artificial intelligence for understanding and generating human language, powering a wide range of applications from conversational agents to content creation tools.

A "diffusion model" is a type of generative machine-learning model that is used for digital content creation, e.g., digital images. In order to train a diffusion model, noise is added to training data samples until the data within the training data samples is obscured. The diffusion model is then trained to reverse this process based on training data that also has a text prompt that describes the digital content to be created in order to generate data samples as the digital content that corresponds to the text prompt.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Enhancement Machine-learning Model Environment

FIG. 1 is an illustration of a digital medium environment 100 in an example implementation that is operable to employ enhancement machine-learning model training data generation and implementation techniques described herein. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations “over the cloud” for the service provider system 102 and as further described in relation to FIG. 9.

The service provider system 102 includes a digital service manager module 108 that is implemented using hardware and software resources 110 (e.g., a processing device and computer-readable storage medium) in support one or more digital services 112. Digital services 112 are made available, remotely, via the network 106 to computing devices, e.g., computing device 104.

Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the one or more digital services 112 via the network 106. A result of processing using the digital services 112 is then returned to the computing device 104 via the network 106.

In the illustrated example, an input 116 is used as a basis by the service provider system 102 to output generative digital content 118 using a generative artificial intelligence (AI) system, illustrated as generative AI system 120. The generative AI system 120 is representative of a variety of functionalities that leverage machine learning to produce the generative digital content 118. Although illustrated as implemented by the digital services 112 of the service provider system 102, the generative AI system 120 may also be implemented locally on the computing device 104, e.g., by the communication module 114.

The generative AI system 120 is configured to process the input 116 through a series of algorithms and neural networks to produce the generative digital content 118, functionality of which is represented as a generative machine-learning model 130. Initially, the generative machine-learning model 130 model is trained on a training data having a vast dataset, learning patterns and structures within the training data.

Given an input 116 (e.g., a text prompt, digital image, etc.), the generative machine-learning model 130 utilizes this trained knowledge to predict and generate generative digital content 118 that is aligned with the input’s context and style. To do so, the generative machine-learning model 130 employs multiple processing layers, where each layer refines the output by adding details and ensuring coherence. The final output is an item of digital content, such as text, images, or music in a manner that mimics the creative processes. However, as previously described the generative machine-learning model 130 in typical real-world scenarios is trained using generalized training data and thereby responds generally to produce a generalized result without further guidance. Accordingly, generative machine-learning models rely heavily on details provided in an input to achieve a result “outside” of a generalized scenario. Conventional techniques used to provide these details, however, rely on specialized knowledge typically gained over a significant amount of time and thus are limited to sophisticated users due to this complexity.

Accordingly, to address these technical challenges, the generative AI system 120 employs a prompt generation module 122 having a prompt enhancement system 124 that employs an enhancement machine-learning model 126 to generate an enhanced prompt 128. The enhancement machine-learning model 126, for instance, is trained to generate an enhancement to the prompt providing context based on a corresponding task, for which, the enhancement machine-learning model 126 is trained.

The prompt enhancement system 124, for instance, is configurable to address technical challenges in generation of digital content using generative AI for a specialized purpose. In a digital marketing scenario, for instance, this difficulty stems from a complexity of combining various elements such as visual composition, emotional appeal, and product presentation in a single digital image, along with the associated high production costs. As a result, subpar results are also generated in conventional examples that fail to encourage user engagement and result in missed opportunities.

As previously described, generative machine-learning models are often trained using a vast amount of generalized training data. Accordingly, these generative machine-learning models rely heavily on the details provided in an input to achieve a result that differs from a generalized scenario. In practice, the details to be included in the prompt are limited to sophisticated users having specialized knowledge gained over a significant amount of time in order to determine what phrasing and aspects are central to achieve a desired result.

When a user input containing a basic or “naïve” input 116 is received by the prompt enhancement system 124, the prompt enhancement system 124 processes the input through a specialized model referred to as an enhancement machine-learning model 126. The enhancement machine-learning model 126 is trained using training data as examples for use in the specialized scenario, e.g., a digital marketing scenario in this example. The enhancement machine-learning model 126, for instance, is trainable using a vast variety of marketing digital images identified as high-performing and high-quality.

As a result, the enhancement machine-learning model 126, once trained, enhances the input 116 by incorporating aspects that included in the training data as indicative of success in a corresponding task. The training data, for instance, is configurable to include high-performing digital images as used in marketing campaigns based on key performance indicators (KPIs). A variety of aspects may be incorporated by the training digital images, examples of which include optimal composition techniques, effective color palettes, emotional resonance, and contextual relevance, among others.

The enhanced prompt 128, as generated by the prompt enhancement system 124 of the prompt generation module 122, is therefore configurable to provide context to the input 116 for processing by the generative machine-learning model 130 to achieve a desired result, e.g., generative digital content 118 as suitable for a particular task, for which, the enhancement machine-learning model 126 is trained. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Machine-learning Prompt Enhancement

The following discussion describes machine-learning prompt enhancement techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

The prompt enhancement system 124 provides a technical solution that decomposes the technical problem into two distinct components in the following discussion. The initial component involves learning a feature prior for a naïve text prompt. This is accomplished through the utilization of a large transformer-based prior model in one or more examples that is trained on digital content having features relevant to a task, for which, the enhancement machine-learning model 126 is to be trained. This approach enables the prior to extract features known to have increased suitability for this task. In a digital image marketing example, for instance, marketing/product photography knowledge is acquired from a given set of digital images used to train the enhancement machine-learning model.

The second component employs another machine-learning model (e.g., a vision-language model (VLM)) to generate text in a way to verbalize the features. The intermediate step of transitioning to a digital image allows the enhancement machine-learning model 126 to learn nuances of the set of digital content 206. Further, this technique addresses the challenge of unavailability of curated prompt pairs (e.g., naïve prompt, enhanced prompt) as such data is not readily available and thus these techniques support training of the enhancement machine-learning model that is not possible in conventional techniques.

The prompt enhancement system 124, in the following discussion, implements a pipeline for prompt enhancement. The pipeline includes learning a "content description" about digital content suitable for use in a desired task in the form of training the enhancement machine-learning model 126 as a "rich feature prior" (RFP) model.

To do so, a machine-learning model is employed to verbalize that knowledge to form the plurality of content descriptions 318 for use in training the enhancement machine-learning model 126. The prompt enhancement system 124, for instance, is configured such that given an input text, patch-wise embeddings are output using a multimodal transformer. These embeddings/features describe the digital image in detail rather than through use of a vector as is conventionally performed. In one or more implementations, "sparse patch selection" is also employed to reduce a memory footprint of large transformer models, enabling faster training with increased accuracy.

As a result, the prompt enhancement system 124 supports a two-step approach to prompt enhancement by the enhancement machine-learning model 126 for a particular tasks, e.g., that enables learning of visual knowledge about particular types of photography from a set of high-quality data. In practice, this knowledge is not generally captured or reflected in the knowledge of pretrained large language models (LLMs), as much of this knowledge is not verbalized in common web data used for training these LLMs. For instance, technical challenges arise in verbalizing what constitutes good lighting or composition for product photography shots of "a luxury handbag." However, if a set of digital images are available for these shots, this knowledge is embedded in the features of these digital images. In this way, the enhancement machine-learning model 126 is designed to learn these features in the following discussion.

Secondly, the prompt enhancement system 124 address the technical challenge of the absence of paired training data, e.g., a naïve text prompt paired with an enhanced text prompt. In the absence of such training data, the prompt enhancement system 124 supports use of high-quality digital content 206 and the learning of the features from the set of digital content described above to generate the enhanced prompt. Thirdly, the "rich feature prior" model of the enhancement machine-learning model 126 may be utilized for various downstream applications as a prior input to a generative machine-learning model 130 to capture aspects of digital content which otherwise may be indescribable using text.

Figure 2:
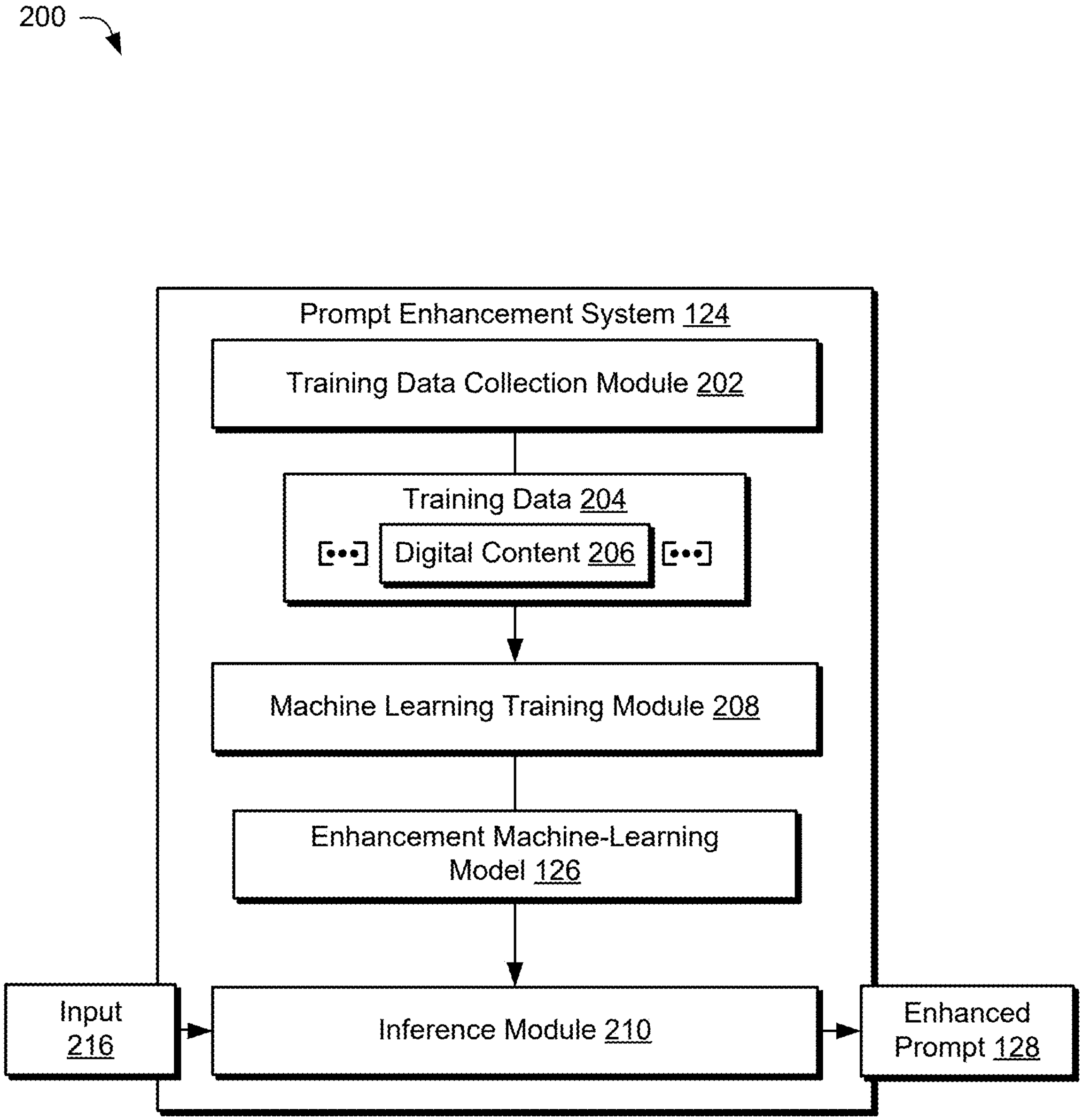
FIG. 2 depicts a system in an example implementation showing operation of the prompt enhancement system of FIG. 1 in greater detail as generating training data, training an enhancement machine-learning model based on the training data, and employing the trained enhancement machine-learning model during inference to generate an enhanced prompt based on an input.
Figure 7:
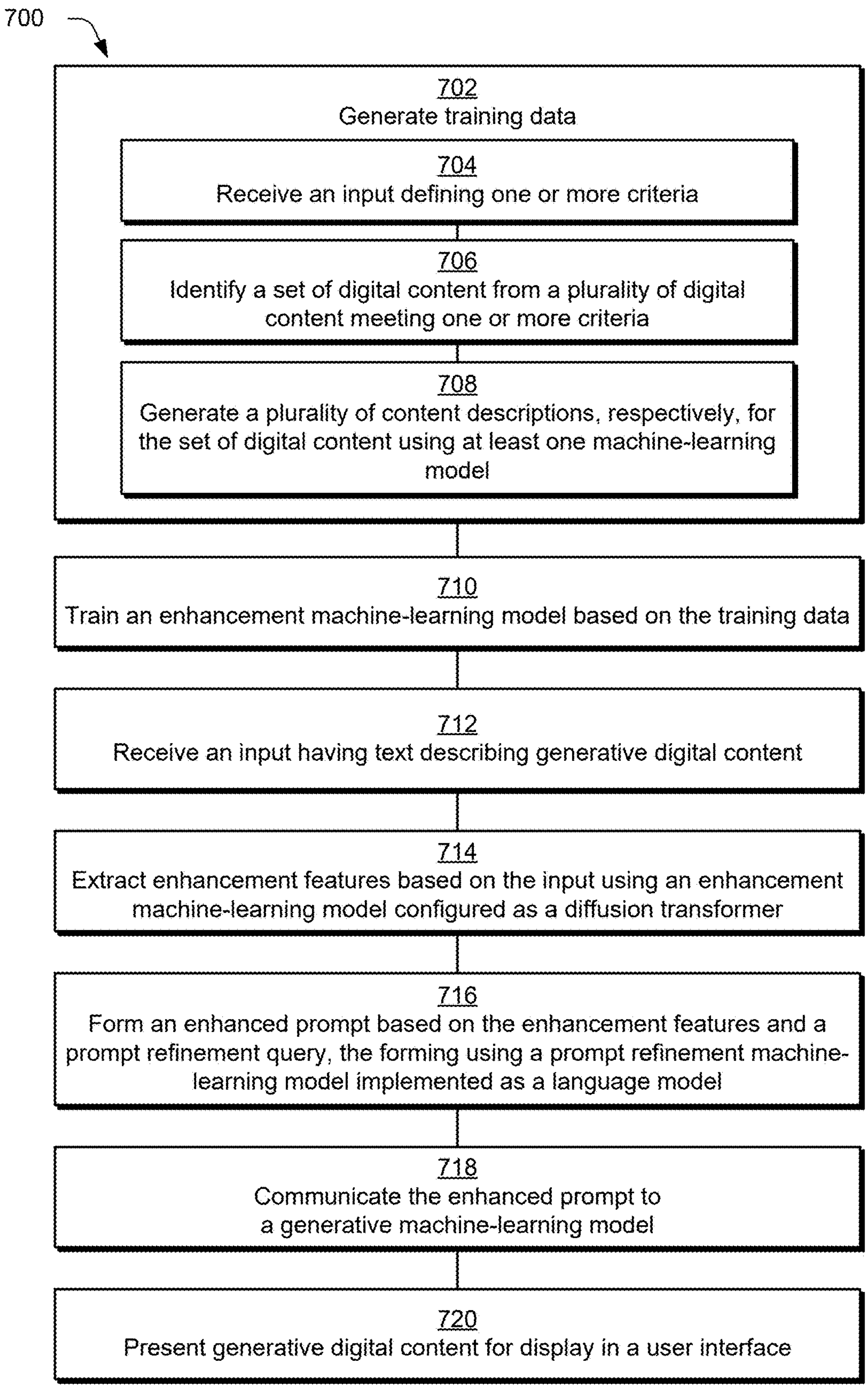
FIG. 7 is a flow diagram depicting an algorithm as a step-by-step procedure in an example implementation of operations performable for accomplishing a result of training data generation, training an enhancement machine-learning model, and using the enhancement machine-learning model to generate an enhancement of a prompt.
Figure 8:
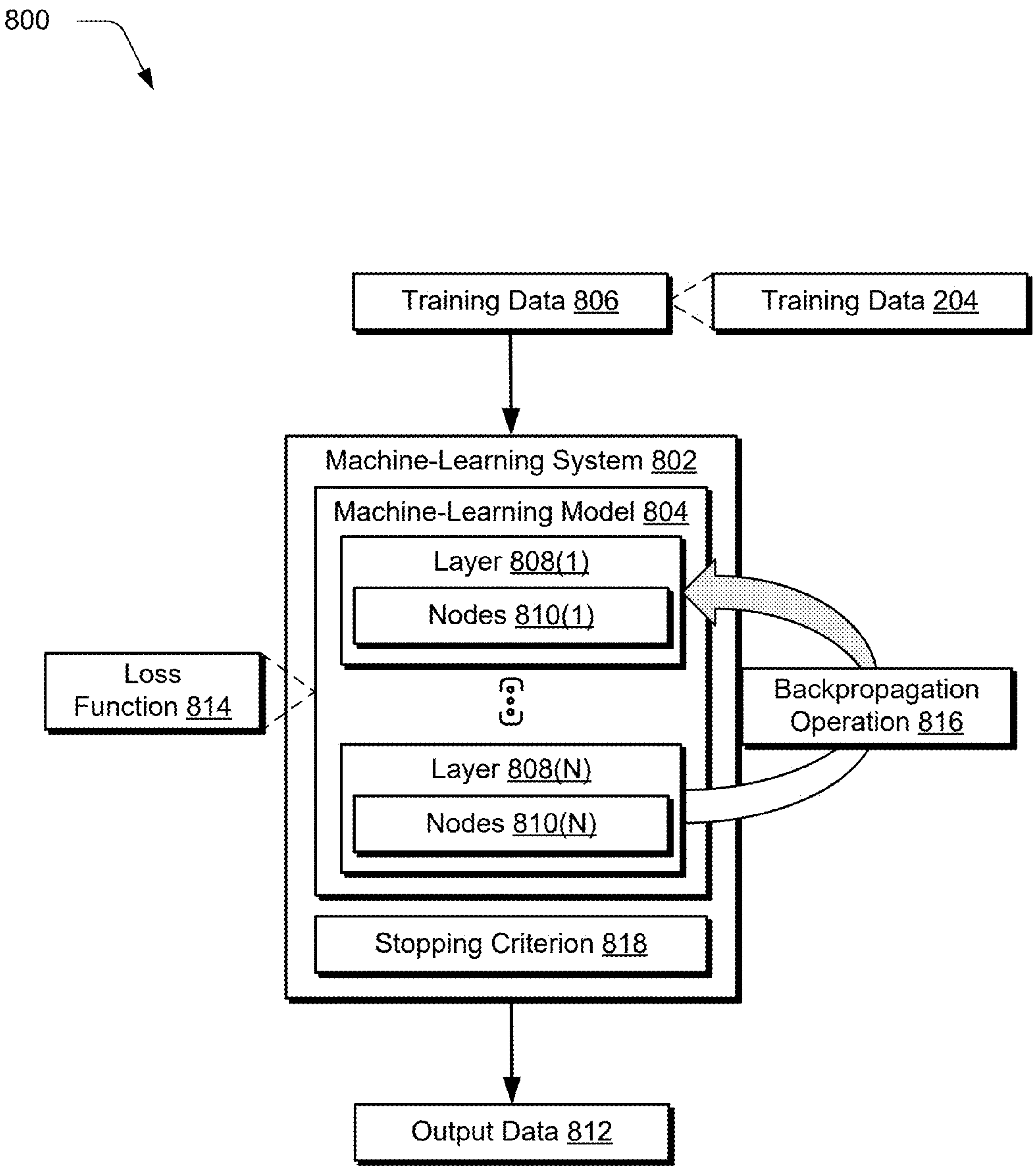
FIG. 8 depicts a system in an example implementation showing training of a machine-learning model of FIGS. 1 and 6 in greater detail.

FIG. 2 depicts a system 200 in an example implementation showing operation of the prompt enhancement system 124 of FIG. 1 in greater detail as generating training data, training an enhancement machine-learning model 126 based on the training data, and employing the trained enhancement machine-learning model 126 during inference to generate an enhanced prompt 128 based on an input 116. FIG. 7 is a flow diagram depicting an algorithm 700 as a step-by-step procedure in an example implementation of operations performable for accomplishing a result of training data generation, training an enhancement machine-learning model, and using the enhancement machine-learning model to generate an enhancement of a prompt. In the following discussion, reference to FIG. 8 is made is parallel to corresponding systems of respective figures.

The prompt enhancement system 124 is illustrated in FIG. 2 as including functionality to collect training data, use the training data to train an enhancement machine-learning model 126, and use the trained enhancement machine-learning model during inference. Corresponding functionality to do so is represented as a training data collection module 202 that is configured to generate training data 204 as a set of digital content 206.

The machine learning training module 208 is then configured to train the enhancement machine-learning model 126 using the digital content 206 of the training data 204. Once trained, an inference module 210 is used "at run time" to operate the enhancement machine-learning model 126 to process an input 116 to generate an enhanced prompt 128, e.g., for processing by the generative machine-learning model 130 to generate generative digital content 118.

Figure 3:
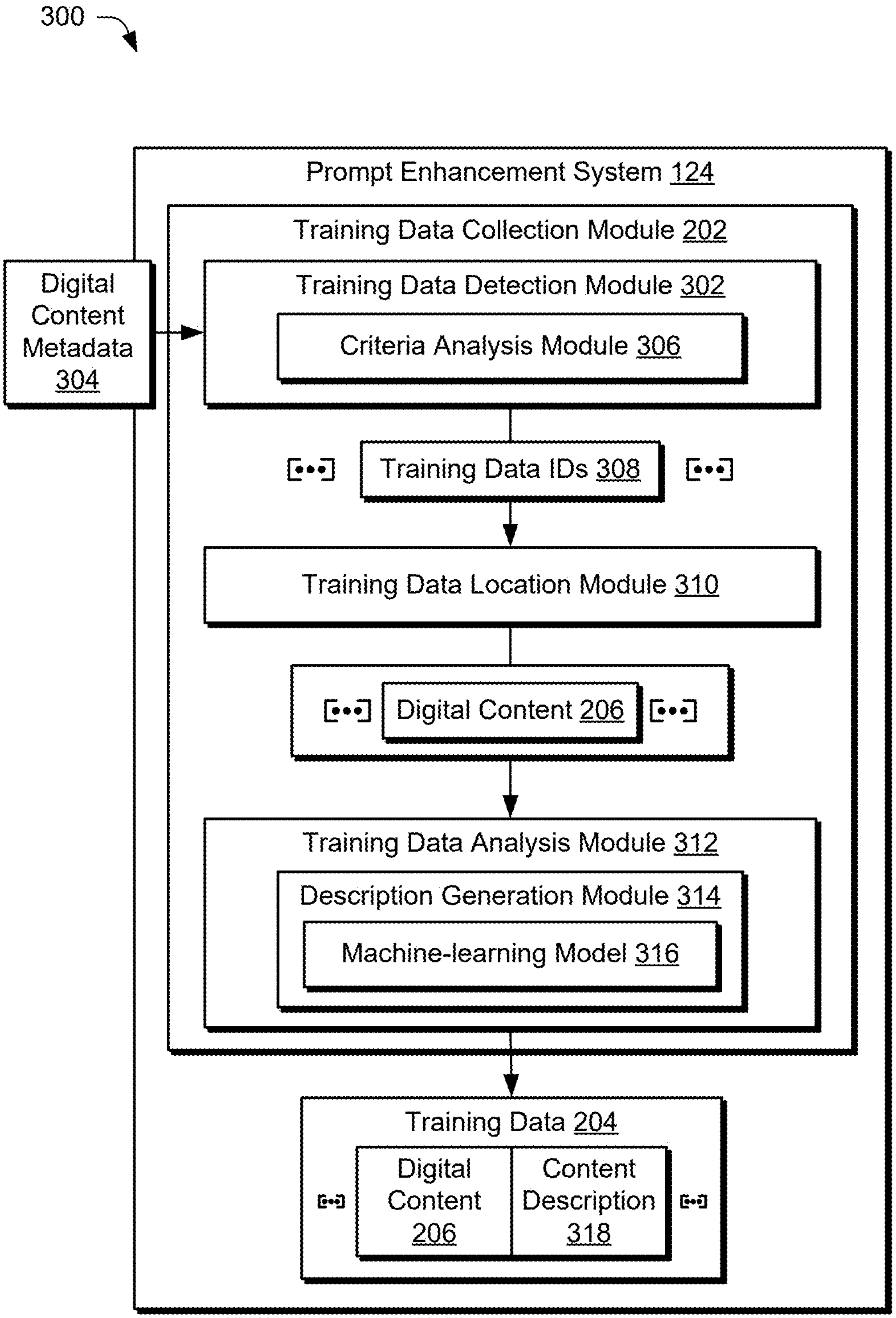
FIG. 3 depicts a system showing operation of a training data collection module of the prompt enhancement system of FIG. 2 in greater detail as generating training data.

FIG. 3 depicts a system 300 showing operation of the training data collection module 202 of the prompt enhancement system 124 of FIG. 2 in greater detail as generating training data. The training data collection module 202 is configured to generate training data 204 (block 702) usable by the enhancement machine-learning model 126 to extract features associated with the input 116. The extracted features are then usable to enhance the prompt to guide the generative machine-learning model 130 to generate the generative digital content 118 as suitable for a particular task, e.g., use in a particular or specialized scenario for which the enhancement machine-learning model 126 is trained.

To do so, the training data collection module 202 employs a training data detection module 302 that is configured to output a user interface, via which, one or more inputs are received defining one or more criteria (block 704). The one or more criteria, for instance, may define an associated task, use, scenario, and so forth, for which, the generative machine-learning model 130 is to be guided. In a digital image generation scenario, for instance, the one or more criteria may describe a use for the digital image, e.g., as part of a technical journal, in a webpage, a cover of a greeting card, an advertisement or other digital marketing media, use as part of a particular genre, to convey an emotion, and so forth.

An input, for example, may be received that selects one or more key performance indicators associated with use of a digital image as part of digital marketing. In response, digital content metadata 304 is obtained describing access to respective items of digital content, e.g., conversions, "click throughs," "click rate," associated revenue amounts, and so forth. The digital content metadata 304 is then analyzed by a criteria analysis module 306 to identify a set of digital content from a plurality of digital content meeting one or more criteria (block 706). The criteria analysis module 306 then selects training data IDs 308 of corresponding training data 204 that meet this criteria, e.g., a user defined or predefined threshold. The training data IDs 308, for instance, may describe relative items of digital content individually and/or collectively as part of a datastore, e.g., a data repository that maintains technical journals.

Next, a training data location module 310 is employed in the illustrated example to locate the digital content 206 corresponding to the training data IDs 308, e.g., through a search, through analysis of a data repository, and so forth. Once located, a training data analysis module 312 employs a description generation module 314 implemented using at least one machine-learning module 316 to generate a plurality of content descriptions 318, respectively, for the set of digital content 206 (block 708).

The machine-learning module 316, for instance, may operate as a digital caption generator configurable to automatically generate the plurality of content descriptions 318 as text captions from digital images. To do so, the machine-learning module 316 may employs a combination of computer vision and natural language processing (NLP) techniques. The process begins with analyzing the digital image by a convolutional neural network (CNN) to extract visual features.

These features are then passed to a recurrent neural network (RNN) (e.g., a Long Short-Term Memory (LSTM) network), which generates a sequence of words to form a coherent caption. The CNN is used to understand content included in the digital image, such as objects, actions, semantics, and scenes. The RNN, on the other hand, is employed to translate this visual information into natural language. In this way, at least one machine-learning module 316 is trained to learn associations between visual elements and corresponding textual descriptions. A variety of other examples are also contemplated to generate content descriptions 318 from corresponding digital content 206, e.g., from digital audio, digital video, text, and so forth.

Consider an example in which the training data detection module 302 receives an input describing one or more criteria as a "digital image suitable for use in a technical publication." In response, training data IDs 308 are located from digital content metadata 304 associated individually with digital images, with a digital image repository as a whole, and so forth. The criteria analysis module 306, for instance, may be tasked with locating individual technical publications through a search, locate a repository of technical publications, and so forth.

The training data location module 310 is then employed to locate the set of digital content 206 corresponding to this criteria. Once located, the description generation module 314 leverages at least one machine-learning module 316 to generate content descriptions 318 of respective items of digital content 206, e.g., using automated digital captioning techniques for digital images, translations for digital audio, and so forth.

Once generated by the training data collection module 202, the training data 204 including the set of digital content 206 and the plurality of content descriptions 318 that are provided as an input to the machine learning training module 208 to train the enhancement machine-learning model 126 (block 710), an example of which is further described below in the following discussion.

Figure 4:
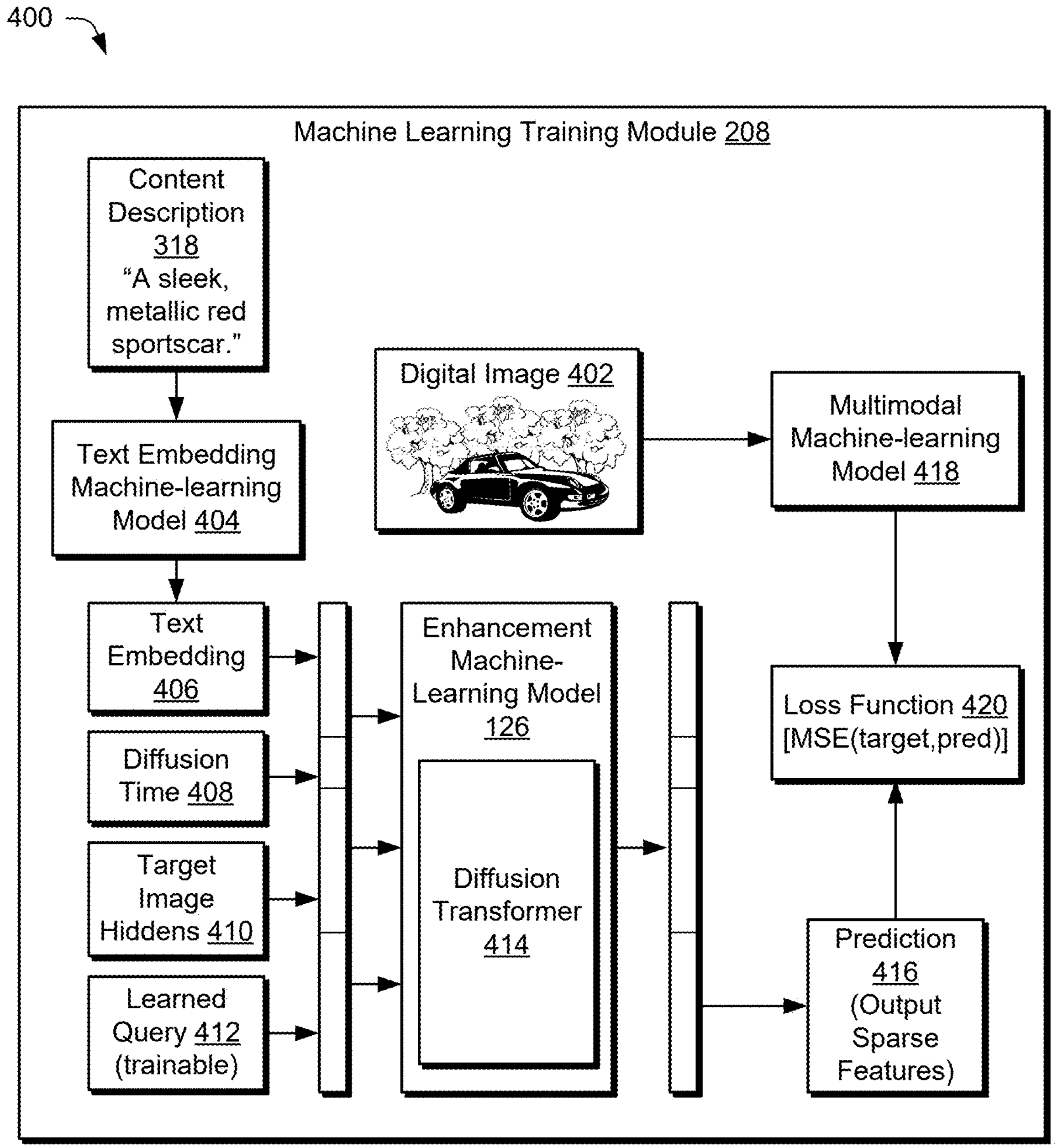
FIG. 4 depicts a system showing operation of a machine learning training module of the prompt enhancement system of FIG. 2 in greater detail as training an enhancement machine-learning model using the training data of FIG. 3.

FIG. 4 depicts a system 400 showing operation of the machine learning training module 208 of the prompt enhancement system 124 of FIG. 2 in greater detail as training the enhancement machine-learning model 126 using the training data 204 of FIG. 3. In this example, the enhancement machine-learning model 126 is trained using the training data 204 of FIG. 3 in which the digital content 206 is configured as a digital image 402 and includes the content description 318 generated as a digital caption from the digital image 402.

The machine-learning training module 208 processes inputs to train the enhancement machine-learning model 126. The machine-learning training module 208 begins with content descriptions 318 are processed through a text embedding machine-learning model 404 to generate a text embedding 406. Concurrently, a digital image 402 is analyzed by a multimodal model 418.

A text embedding machine-learning model 404 processes the content description 318 to generate a text embedding. The enhancement machine-learning model 126 receives the embedding 406 along with a variety of other inputs, examples of which include a diffusion time 408, target image "hiddens" 410, and a learned query 412. A diffusion transformer 414 of the enhancement machine-learning model 126 then processes these inputs to produce a prediction 416 containing output sparse features.

The prediction 416 is then compared using a loss function 420 with the output from the multimodal model 418 generated from processing the digital image 402. The loss function 420 is configurable in a variety of ways, such as to compute a mean squared error between the prediction 416 of the output sparce features from content description 318 and the target features derived from the digital image 402 by the multimodal model 418. The loss function 420, for instance, is configurable to train the enhancement machine-learning model 126 using a subset of tokens. In one or more examples, input and output sequence length is same for the diffusion transformer 414, however the loss function 420 is applied solely on a last 97 tokens (i.e., features) as part of a sparse patch selection approach to improve training efficiency.

The results of this comparison are used to adjust the parameters of the enhancement machine-learning model 126 as part of training, improving its ability to generate enhanced prompts that capture both textual and visual aspects of the input data.

Through iterative training, the enhancement machine-learning model 126 learns to generate enhancements to create contextually rich prompts based on a text description. This process enables the enhancement machine-learning model 126 to develop a sophisticated understanding of the relationship between visual content and textual descriptions, ultimately leading to effective prompt enhancement capabilities usable to guide generation of the generative machine-learning model 130 in generating the generative digital content 118.

Figure 5:
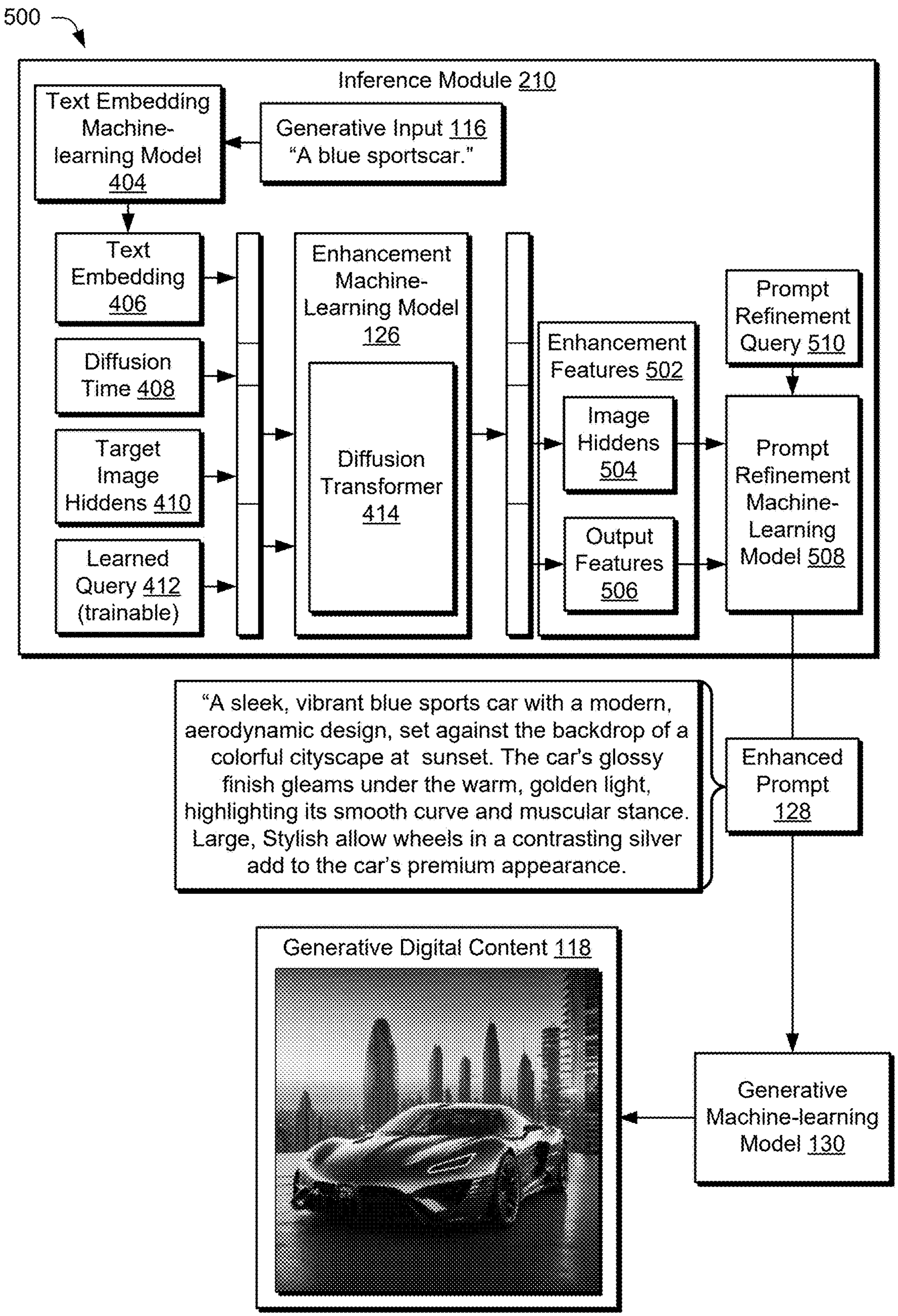
FIG. 5 depicts a system showing operation of an inference module of the prompt enhancement system of FIG. 2 in greater detail as employing a trained enhancement machine-learning model of FIG. 4 to generate an enhanced prompt.

FIG. 5 depicts a system 500 showing operation of the inference module 210 of the prompt enhancement system 124 of FIG. 2 in greater detail as employing the trained enhancement machine-learning model 126 of FIG. 4 to generate an enhanced prompt. The corresponding portion of the algorithm 700 of FIG. 7 begins with receiving an input 116 having text describing generative digital content (block 712). In the illustrated example, the input 116 includes text of "A blue sportscar."

The input 116 is processed by a text embedding machine-learning model 404 to generate a text embedding 406. The text embedding 406, along with diffusion time 408, target image "hiddens" 410, and a learned query 412, are input into the enhancement machine-learning model 126. The enhancement machine-learning model 126, configured as a diffusion transformer 414, extracts enhancement features 502 based on the input 116 (block 714). The enhancement features 502 include image "hiddens" 504 and output features 506, which represent sparse features derived from the input.

A prompt refinement machine-learning model 508, implemented as a language model in this example, forms a prompt (illustrated as enhanced prompt 128") based on the enhancement features 502 and a prompt refinement query 510 (block 716). The prompt refinement query 510 provides instructions for enhancing the prompt, enabling the prompt refinement machine-learning model 508 to incorporate details from the image features and expand the initial input.

FIG. 6 depicts an example implementation 600 of a prompt refinement query usable 510 to prompt a prompt refinement machine-learning model along with enhancement features 502 to generate an enhanced prompt 128. The prompt refinement query 510 defines a role, scenario, and so forth to be mimicked by the prompt refinement machine-learning model 508 along with step-by-step instructions to create the enhanced prompt 128. The step-by-step instructions, for instance, include (1) to analyze the product, (2) set the scene, (3) composition, (4) lighting, (5) color palette, (6) mood and atmosphere, (7) technical details, (8) human elements, (9) enhance and enhance, and (10) marketing angle in this example.

Returning again the FIG. 5, the enhanced prompt 128 is then communicated to a generative machine-learning model 130 (block 718). In the illustrated example, the enhanced prompt 128 expands the original input "A blue sportscar" into a detailed description serving as an enhancement to the input as: "A sleek, vibrant blue sports car with a modern, aerodynamic design, set against the backdrop of a colorful cityscape at sunset. The car's glossy finish gleams under the warm, golden light, highlighting its smooth curve and muscular stance. Large, Stylish allow wheels in a contrasting silver add to the car's premium appearance."

The generative machine-learning model 130 generates the generative digital content 118 based on the enhanced prompt 128. The generative digital content 118 is then presented for display in a user interface (block 720). In this case, the generative digital content 118 is an image of a blue sports car in a mountain setting, reflecting the detailed description provided in the enhanced prompt 128.

FIG. 8 depicts a system in an example implementation 800 showing training of a machine-learning model of FIGS. 1 and 6 in greater detail. The machine-learning system 802 implementation a machine-learning model 804 as an example of the enhancement machine-learning model 126. The machine-learning system 802 is representative of functionality to generate training data 806 (e.g., as an example of training data 204), use the generated training data 806 to train the machine-learning model 804, and/or use the machine-learning model 804 as implementing the functionality described herein.

A machine-learning model 804 refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

In the illustrated example, the machine-learning model 804 is configured using a plurality of layers 808(1), . . . , 808(N) having, respectively, a plurality of nodes 810(1), . . . , 810(N). The plurality of layers 808(1)-811(N) are configurable to include an input layer, an output layer, and one or more hidden layers. Calculations are performed by the nodes 810(1)-810(N) within the layers via hidden states through a system of weighted connections that are "learned" during training of the machine-learning model 804 to implement a variety of tasks.

In order to train the machine-learning model 804, training data 806 is received that provides examples of "what is to be learned" by the machine-learning model 804, i.e., as a basis to learn patterns from the data. The machine-learning system 802, for instance, collects and preprocesses the training data 806 that includes input features and corresponding target labels, i.e., of what is exhibited by the input features. The machine-learning system 802 then initializes parameters of the machine-learning model 804, which are used by the machine-learning model 804 as internal variables to represent and process information during training and represent interferences gained through training. In an implementation, the training data 806 is separated into batches to improve processing and optimization efficiency of the parameters of the machine-learning model 804 during training.

The training data 806 is then received as an input by the machine-learning model 804 and used as a basis for generating predictions based on a current state of parameters of layers 808(1)-808(N) and corresponding nodes 810(1)-810 (N) of the model, a result of which is output as output data 812. Output data 812 describes an outcome of the task, e.g., as a probability of being a member of a particular class in a classification scenario.

Training of the machine-learning model 804 includes calculating a loss function 814 to quantify a loss associated with operations performed by nodes of the machine-learning model 804. The calculating of the loss function 814, for instance, includes comparing a difference between predictions specified in the output data 812 with target labels specified by the training data 806. The loss function 814 is configurable in a variety of ways, examples of which include regret, Quadratic loss function as part of a least squares technique, and so forth.

Calculation of the loss function 814 also includes use a backpropagation operation 816 as part of minimizing the loss function 814 and thereby training parameters of the machine-learning model 804. Minimizing the loss function 814, for instance, includes adjusting weights of the nodes 810(1)-810(N) in order to minimize the loss and thereby optimize performance of the machine-learning model 804 in performance of a particular task. The adjustment is determined by computing a gradient of the loss function 814, which indicates a direction to be used in order to adjust the parameters to minimize the loss. The parameters of the machine-learning model 804 are then updated based on the computed gradient.

This process continues over a plurality of iteration in an example until a stopping criterion 818 is met. The stopping criterion 818 is employed by the machine-learning system 802 in this example to reduce overfitting of the machine-learning model 804, reduce computational resource consumption, and promote an ability of the machine-learning model 804 to address previously unseen data, i.e., that is not included specifically as an example in the training data 806. Examples of a stopping criterion 818 include but are not limited to a predefined number of epochs, validation loss stabilization, achievement of a performance improvement threshold, or based on performance metrics such as precision and recall.

Configuration of the training data 806 is usable to support a variety of usage scenarios. In one example, the training data 806 is configured as training data 204 usable to train the enhancement machine-learning model 126 to generate an enhanced prompt 128 thereby providing context to the input 116 for performance of a particular task, use in a particular scenario, and so forth. A variety of other examples are also contemplated.

Example System and Device

Figure 9:
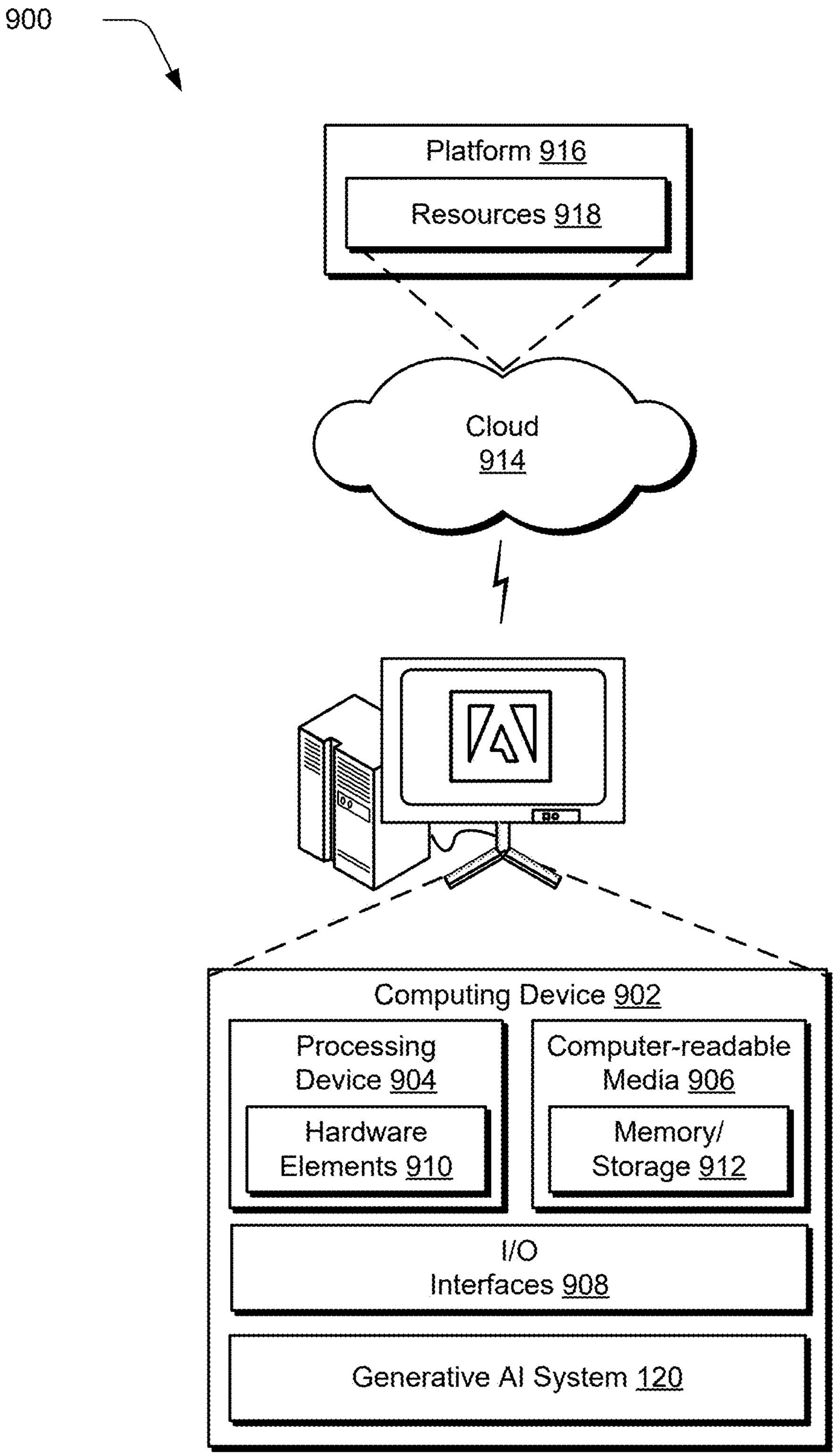
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the generative AI system 120. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912 that stores instructions that are executable to cause the processing device 904 to perform operations. The computer-readable storage medium is configured for storing instructions that, responsive to execution by the processing device, causes the processing device to perform operations. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media." "Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

In implementations, the platform 916 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, an input having text describing generative digital content;

extracting, by the processing device, enhancement features describing the generative digital content based on the input and embeddings associated with the input by using an enhancement machine-learning model configured as a diffusion transformer, the diffusion transformer generating the enhancement features using sparse patch selection;

forming, by the processing device, an enhanced prompt based on the enhancement features and a prompt refinement query, the forming using a prompt refinement machine-learning model implemented as a language model; and presenting, by the processing device, the generative digital content for display in a user interface, the generative digital content generated using generative artificial intelligence (AI) implemented using one or more machine-learning models based on the enhanced prompt.

2. The method as described in claim 1, further comprising generating, by the processing device, a text embedding based on the input using at least one machine-learning model and wherein the extracting is based on the text embedding.

3. The method as described in claim 1, wherein the enhancement features specify one or more visual aspects to be used as a basis to generate the generative digital content.

4. The method as described in claim 1, wherein the prompt refinement query specifies a plurality of steps to be followed in generating the enhanced prompt.

5. The method as described in claim 4, wherein the steps include instructions to set a visual scene, composition, lighting, a color palette, a mood and atmosphere, and technical camera details.

6. The method as described in claim 1, further comprising training the enhancement machine-learning model based on training data.

7. The method as described in claim 6, further comprising generating the training data, the generating including:

identifying a set of digital content from a plurality of digital content meeting one or more criteria; and generating a plurality of content descriptions, respectively, for the set of digital content using a machine-learning model.

8. The method as described in claim 1, wherein the generative digital content is a digital image.

9. The method as described in claim 1, wherein the generative digital content is digital audio or digital video.

10. One or more computer-readable storage media storing instructions that, responsive to execution by a processing device, causes the processing device to perform operations comprising:

extracting enhancement features based on an input describing generative digital content and embeddings associated with the input using an enhancement machine-learning model configured as a diffusion transformer, the diffusion transformer generating the enhancement features using sparse patch selection;

forming an enhanced prompt based on the enhancement features and a prompt refinement query, the forming using a prompt refinement machine-learning model implemented as a language model;

communicating the enhanced prompt to at least one machine-learning model to generate generative digital content using generative artificial intelligence (AI); and receiving the generative digital content for display in a user interface.

11. The one or more computer-readable storage media as described in claim 10, wherein the instructions further comprise generating a text embedding based on the input using at least one machine-learning model and wherein the extracting is based on the text embedding.

12. The one or more computer-readable storage media as described in claim 10, wherein the prompt refinement query specifies one or more visual aspects to be used as a basis to generate the generative digital content.

13. The one or more computer-readable storage media as described in claim 12, wherein the prompt refinement query specifies a plurality of steps to be followed in generating the enhanced prompt.

14. The one or more computer-readable storage media as described in claim 13, wherein the steps include instructions to set a visual scene, composition, lighting, a color palette, a mood and atmosphere, and technical camera details.

15. A computing device comprising:

a processing device; and a computer-readable storage medium storing instructions that, responsive to execution by the processing device, causes the processing device to perform operations including:

extracting enhancement features based on an input describing generative digital content and embeddings associated with the input using an enhancement machine-learning model configured as a diffusion transformer the diffusion transformer configured to generate the enhancement features using sparse patch selection;

forming an enhanced prompt based on the enhancement features and a prompt refinement query, the forming using a prompt refinement machine-learning model implemented as a language model;

communicating the enhanced prompt to at least one machine-learning model to generate generative digital content using generative artificial intelligence (AI); and receiving the generative digital content for display in a user interface.

16. The computing device as described in claim 15, wherein the input includes one or more criteria as based on a number of times a respective item of said digital content is accessed.

17. The computing device as described in claim 15, wherein the input includes one or more criteria as based on a revenue amount generated by a respective item of said digital content.

18. The computing device as described in claim 15, wherein the generative digital content is configured as digital images, and descriptions of the generative digital content are formed as text generated using the at least one machine-learning model from the digital images.

19. The computing device as described in claim 15, wherein training of the enhancement machine-learning model is performed using a subset of tokens generated for the generative digital content, respectively.

20. The computing device as described in claim 15, wherein the enhancement machine-learning model extracts enhancement features including sparse features derived from the input.

* * * * *